(12) United States Patent
Bottrill

(10) Patent No.: US 6,920,220 B2
(45) Date of Patent: Jul. 19, 2005

(54) PRE-ZERO CROSSING SIGNAL GENERATOR FOR SINUSOIDAL VOLTAGES WITH DC OFFSETS SUCH AS TELEPHONE RING VOLTAGES

(75) Inventor: John Bottrill, Amherst, NH (US)

(73) Assignee: Texas Instruments Incorporated, Dallas, TX (US)

( * ) Notice: Subject to any disclaimer, the term of this patent is extended or adjusted under 35 U.S.C. 154(b) by 550 days.

(21) Appl. No.: 09/990,836

(22) Filed: Nov. 14, 2001

(65) Prior Publication Data

US 2003/0091179 A1 May 15, 2003

(51) Int. Cl.[7] .............................................. H04M 3/00
(52) U.S. Cl. ...................... 379/418; 379/382; 379/383; 379/384
(58) Field of Search ................. 379/378, 377, 379/372, 399.01, 413.01, 418, 422, 395

(56) References Cited

U.S. PATENT DOCUMENTS 4,396,805 A * 8/1983 Wagner ...................... 379/252
4,631,361 A * 12/1986 Miller ........................ 379/351
5,185,738 A * 2/1993 Kelly ......................... 370/458
5,406,623 A * 4/1995 Rovik ........................ 379/418
5,636,274 A * 6/1997 Youngblood ................ 379/413
6,115,469 A * 9/2000 Dalal et al. ................. 379/418

* cited by examiner

Primary Examiner—Curtis Kuntz
Assistant Examiner—Tuan Pham
(74) Attorney, Agent, or Firm—W. Daniel Swayze, Jr.; W. James Brady; Frederick J. Telecky, Jr.

(57) ABSTRACT

A circuit for closing a relay when an active AC voltage connected to one of the contacts of the relay is approximately zero volts includes a monitoring circuit that monitors the active AC voltage and outputs a phase-shifted voltage that crosses zero volts at predetermined times before the active AC voltage traverses zero volts. A pulse generating circuit initiates a pulse when the phase-shifted voltage enters a predefined voltage region and terminates the pulse when the voltage exits that region. An input signal is strobed onto the control input of the relay by the pulse so that the relay changes state coincident with the zero crossing of the active AC voltage.

7 Claims, 6 Drawing Sheets

PRE-ZERO CROSSING SIGNAL GENERATOR FOR SINUSOIDAL VOLTAGES WITH DC OFFSETS SUCH AS TELEPHONE RING VOLTAGES

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates to the field of telephony, and more particularly ring generator circuitry for telephone systems.

All telephones require an alerting signal or ring signal for notifying a subscriber of an incoming phone call. Early telephones employed mechanical bells that rang in response to an electrical ringing signal appearing on the telephone line. The mechanical bells required a low frequency, high voltage AC signal for ringing. The amplitude of the ring signal had to be relatively high, for example at least 45 volts AC at the phone, and the frequency needed to be quite accurate to ring the phone without fail. Typically, the ring signal is superimposed on a DC voltage that enables the circuitry to detect when the customer goes "off hook" or answers the telephone. Backward compatibility requirements have kept the characteristics of the ringing signal essentially the same over the last century.

The line carrying the ring signal to a telephone instrument is connected to a ring generator when a ring signal is needed and to a talk battery voltage source otherwise. Thus telephone ring signal lines are connected to relays with additional logic to switch the ring generator and the talk battery voltage source onto them for each telephone instrument.

The relays used in telephone circuits are degraded by the action of switching while the high voltages used in the ring generator are across the contacts. The contacts suffer from arcing, pitting and other effects that reduce their useful life. Therefore, with today's systems it is sometimes useful to have the relays switch when the voltage is at or near zero volts as opposed to the −48 volts of the talk battery. This however requires that the switching action take place at unsymmetrical points on the voltage waveforms.

BRIEF SUMMARY OF THE INVENTION

A circuit that commands a relay to switch when the voltage across the relay is approximately zero volts improves the reliability of the relay. The circuit monitors a periodic AC voltage input and provides an indication that the voltage will cross the zero volts threshold a specified time before the crossing. The indication is converted into a pulse for switching the relay. Other aspects, features, and advantages of the present invention are disclosed in the detailed description that follows.

BRIEF DESCRIPTION OF THE SEVERAL VIEWS OF THE DRAWING

The invention will be understood from the following detailed description in conjunction with the drawings, of which.

DETAILED DESCRIPTION OF THE INVENTION

Relay contacts wear faster if the relay is activated when there is voltage across the contacts. Therefore, for relays carrying AC voltages having a zero crossing, it is desirable to activate the relay when the voltage across the contacts is zero. Since relays exhibit a lag time between the time of a command to switch and the actual closure, the command to switch the relay must precede the zero voltage crossing event. It is therefore desirable to predict the zero crossing and command the closure sufficiently before crossing to account for the lag time.

Figure 1:
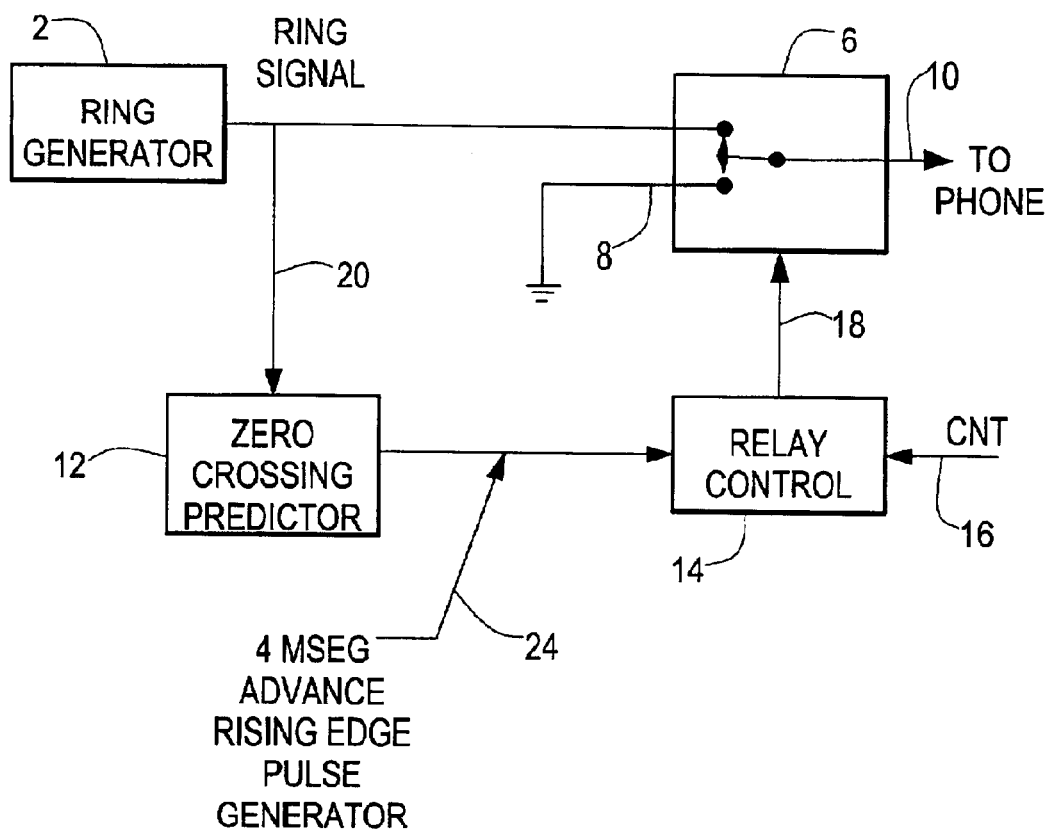
FIG. 1 is a block diagram of a telephone ring signal generator that utilizes a circuit in accordance with the invention.

FIG. 1 is a block diagram illustrating how a zero crossing predictor is integrated into a ring generator. A ring generator circuit, 2 as is known in the industry, outputs an AC ring signal 20 having a zero voltage crossing and a known DC offset of the AC voltage. This ring signal 20 provides sufficient power to drive the telephone instrument ring signal 10. The signal 20 is monitored by the zero crossing predictor circuit 12. The generator output 20 connects to one pole of a relay 6 that has a ground voltage 8 connected to the other pole. The switchable contact 10 of relay 6 drives the phone ring signal line.

The zero crossing predictor 12 outputs a pulse 24 of a specified width a set time before the ring signal zero crossing. This pulse 24 is used to strobe a relay control circuit 14. The relay control circuit 14 is connected to a control line 16. When the control line 16 is activated, the ring signal 20 is connected to the telephone ring signal 10, and when the control line 16 is deactivated, the ground 8 is connected to the telephone ring signal 10. Although the control line 16 changes state independent of the ring generator 2, the pulse 24 synchronizes the change of a relay control line 18 to coincide with the ring signal zero volt crossing.

Figure 2:
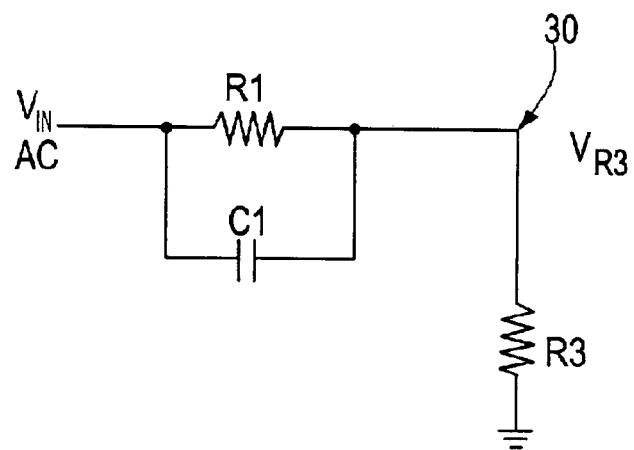
FIG. 2 is a schematic of a voltage divider with a phase shift used in a zero crossing predictor of FIG. 1.

In telecommunications practice, the ring signal may be a sawtooth, a trapezoid or a sinusoidal waveform. However, to meet the Bell Core standards it has to be a low distortion sinusoidal waveform. In the representative implementation described below a sinusoidal waveform similar to that defined in the Bell Core Standards is used. FIG. 2 is a schematic of a circuit that phase shifts an input AC voltage $V_{in}$. Resistors $R_1$ and $R_3$ divide the input voltage, while capacitor $C_1$ causes a phase shift of the AC component of $V_{in}$ at node 30. The component values are calculated to provide the desired lead time for the particular DC offset and peak-to-peak swing of the sinusoidal waveform.

Figure 3:
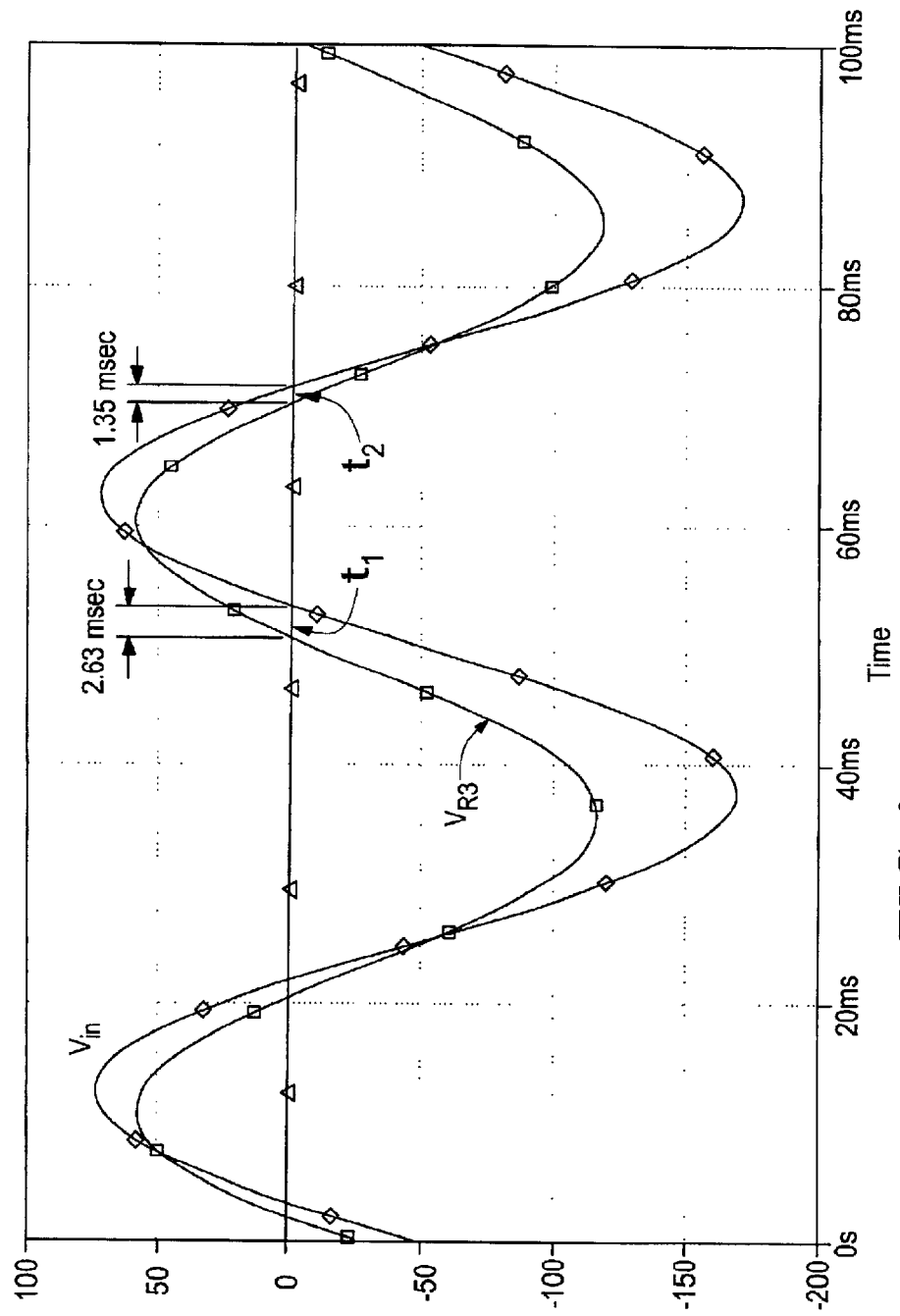
FIG. 3 is a graph of the waveforms of two voltages of the phase shift circuit of FIG. 2.

FIG. 3, having a vertical dimension calibrated in volts and a horizontal dimension calibrated in milliseconds, illustrates the phase shift of the voltage $V_{R3}$ relative to $V_{in}$. One cycle of the waveform is approximately illustrated between times 38 msec and 90 msec. At time 38 msec $V_{in}$ is approximately −170V while $V_{R3}$ is approximately −110V. As time progresses and the input voltage enters the rising portion of the waveform, the change in $V_{R3}$ leads the change in $V_{in}$ due to the phase shift. $V_{R3}$ and $V_{in}$ cross the 0V line at approximately 50 msec and 52 msec respectively. $V_{R3}$ leads $V_{in}$ by a time period $t_1$, where in the illustrated example $t_1$ ~2.63 msec. $V_{in}$ reaches its maximum at time 62 msec, marking the end of the rising waveform. The descending $V_{in}$ waveform recrosses the 0V line at approximately 72 msec with $V_{R3}$ preceding $V_{in}$ across the 0V line at approximately 70 msec. The lead time $t_2$ of $V_{R3}$ before $V_{in}$ at this second crossing, is ~1.35 msec. The difference in the lead times is a result of the DC offset and the difference of slopes of the two waveforms. Since the purpose of the circuit is to activate a relay a specified time before $V_{in}$ crosses the 0V line, the difference between the time periods $t_1$ and $t_2$ is undesirable.

Figure 4:
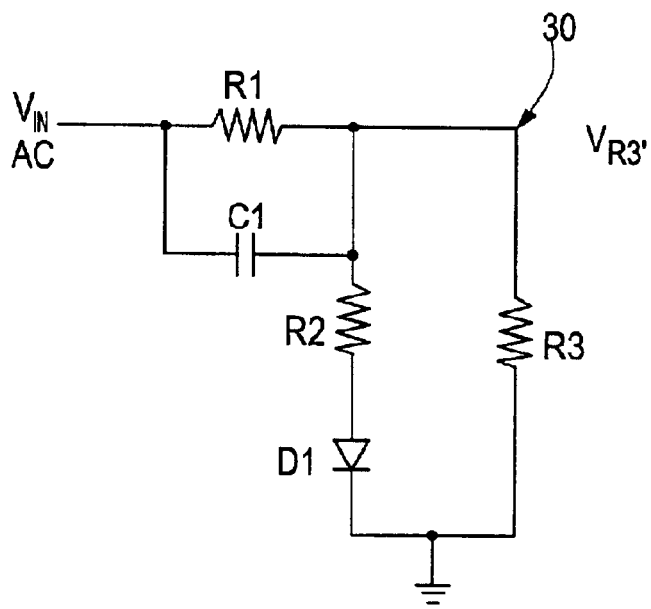
FIG. 4 is a schematic of an improved voltage divider with a phase shift as used in the zero cross predictor of FIG. 1.

Since the lead time to switch the relay needs to be at least as large as $t_1$, $t_2$ must be increased. One way to accomplish this is by modifying the phase shift of the $V_{R3}$ during the descending portion of waveform $V_{in}$ before the zero crossing. An implementation to accomplish this phase shift is shown in FIG. 4. In FIG. 4, diode $D_1$ and resistor $R_2$ are placed in parallel with resistor $R_3$. When the voltage at $V_{R3}'$ is positive, diode $D_1$ conducts, placing resistor $R_2$ in parallel with resistor $R_3$ to lower the resistance in the $R_3$ leg of the voltage divider. This change results in a reduced voltage across $R_3$ and a change in the phase shift and slope of the voltage at node 30.

Figure 5:
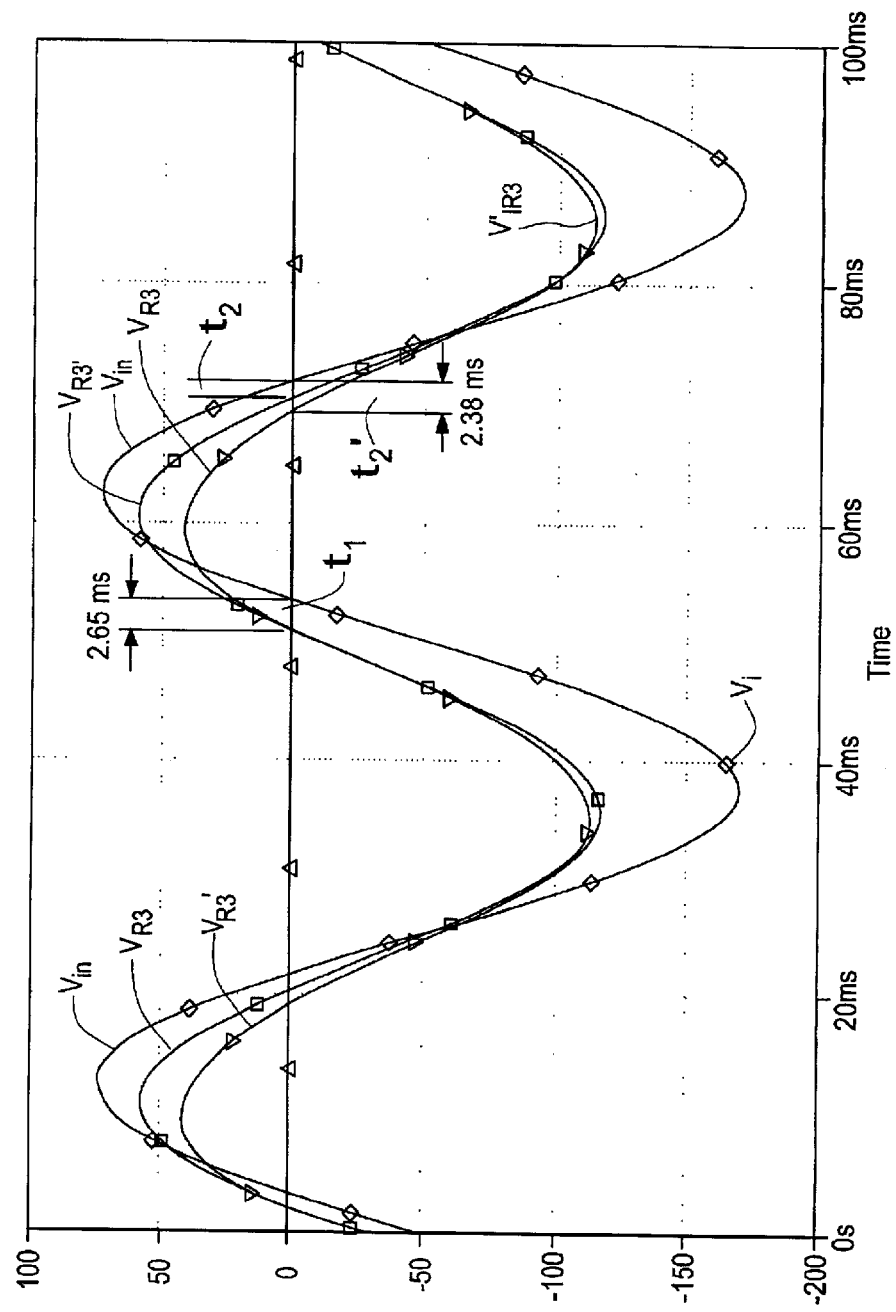
FIG. 5 is a graph contrasting the outputs of the circuits of FIG. 2 and FIG. 4.

In FIG. 5, the voltage at $V_{R3}'$ from the circuit of FIG. 4 is plotted against $V_{in}$ and $V_{R3}$ from FIG. 2. Note that the voltage swing of $V_{R3}'$ is approximately equal to that of $V_{R3}$ when $V_{in}$ is less than 0V, and is reduced when $V_{in}$ is greater than 0V. While $t_1$ remains unchanged, $t_2'$ is increased relative to $t_2$ from 1.35 msec to 2.38 msec. These values can be adjusted by appropriate selection of $R_2$. Although $t_2'$ could have been adjusted to be equal to $t_1$, the circuit of FIG. 4 purposely retains a difference of 0.5 msec of lead time to be added to $t_2'$. The further refinements illustrated in FIG. 6 below compensate for this difference.

Figure 6:
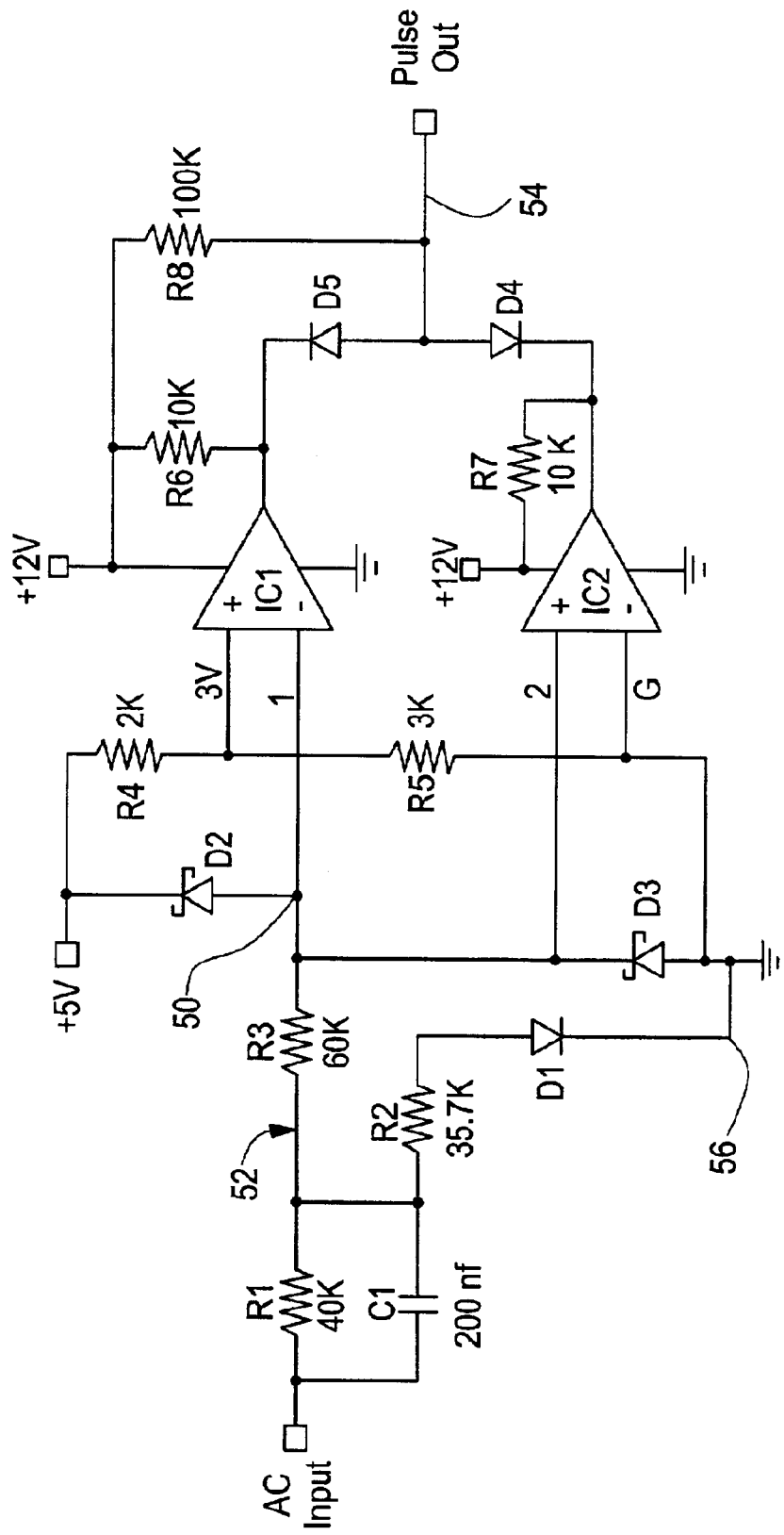
FIG. 6 is a schematic of a pulse generator utilizing voltage divider with a phase shift that outputs a pulse to drive the relay control of FIG. 1.

Having developed a circuit that produces a zero crossing at a specified time before a reference waveform crosses zero volts, it is desirable to issue an indicator pulse, such as can be used to trigger the relay of FIG. 1, at the set time before each zero crossing of $V_{in}$. FIG. 6 shows one implementation to generate such pulses.

In FIG. 6, the circuit of FIG. 4 is reproduced on the left, with the addition of Schottky diodes D2 and D3 limiting the range of the junction point 50 to between −0.3V and +5V. Junction point 50 in FIG. 6 is equivalent to junction point 30 in FIGS. 2 and 4. The differential amplifiers IC1 and IC2 connected to the junction point 50 detect whether the voltage at 50 is at ground or above a positive threshold set by a resistor divider network R4/R5. The divider of FIG. 6 sets the voltage at the non-inverting input of IC1 to +3V. Junction point 50 is connected to the inverting input of IC1 and the non-inverting input of IC2. When the voltage at node 52 is at or below ~−0.3V, diode D3 conducts, preventing the junction point 50 from going lower than −0.3V. When this voltage is at or above ~5.0V, diode D2 conducts, preventing junction point 50 from exceeding +5V. The voltage at node 50 is compared to the thresholds set by the resistor divider. The outputs of IC1 and IC2 are simultaneously high only when the voltage of node 50 is between zero volts and 3 volts.

Diodes D4 and D5 are configured as a negative OR of the outputs of IC1 and IC2, with D4 holding node 54 at ground when node 50 is less than 0 volts and D5 holding node 54 at ground when node 50 is greater than 3 volts. The portions of the circuit including resistors R6, R7, and R8 provide pull ups for the outputs. Node 54 transitions to approximately +10 volts as the voltage at node 50 enters the region between 0 and 3 volts and transitions back to 0 volts when the voltage at node 50 transitions out of the region.

Figure 7:
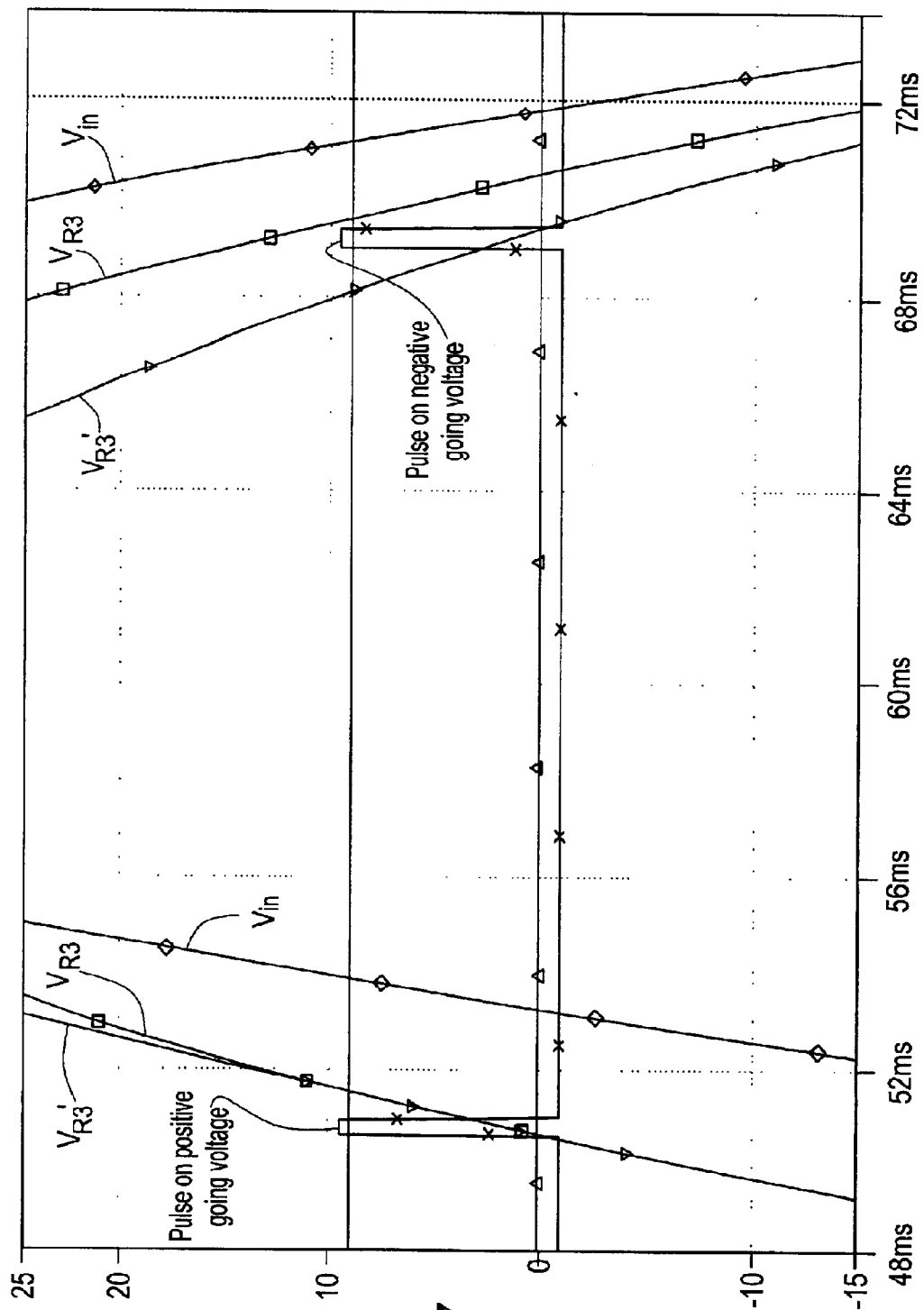
FIG. 7 is a graph of the outputs of the circuit of FIG. 6.

For the illustrative implementation of FIG. 6 and the waveforms of FIG. 5, circuit output 54 is a pulse approximately 0.4 msec wide as shown in FIG. 7 at approximate times 50 msec and 69 msec. The width of the pulse depends on the rate of change of the input signal 50 as it traverses the region between 0 and 3 volts. The pulse at 50 msec is initiated when the voltage at node 50 first becomes greater than 0 volts, co-incident with the leading edge of $t_1$, in this case 2.63 msec before $V_{in}$ crosses 0 volts. The width of the pulse is dependent on the time that $V_{in}$ takes to change from 0V to +3V. The pulse at 69 msec is initiated when the voltage at node 50 first becomes less than +3 volts. This is not coincident with the leading edge of $t_2'$, but occurs a pulse width before the leading edge of $t_2'$. Therefore, when the difference between $t_1$ and $t_2'$ equals the pulse width, the leading edge of the pulses at node 54 will precede the zero crossing of $V_{in}$ by the same amount of time. In FIG. 7, the time between the leading edges of the pulses and the zero crossings of the ring signal lead times are within 0.1 msec of each other with each of the pulses approximately 0.4 msec in duration.

Further noise immunity can be imparted to the output by connecting the cathode 56 of D1 to the output of IC2. Additionally, hysteresis could be added to the circuit by providing additional feedback circuits from the output of either IC1 or IC2 to other points in the circuit, as is known in the art.

The component values in FIG. 6 have been calculated to produce the desired lead time for a sinusoidal waveform with a −50V DC offset and a swing of 240V p—p. In applying the circuit shown above to other AC waveforms, the frequency, DC offset and peak-to-peak voltage swing are measured. The discrete component values are selected, as is known in the art, to yield the needed phase shift and pulse width.

Having described preferred embodiments of the invention it will now become apparent to those of ordinary skill in the art that other embodiments incorporating these concepts may be used. Accordingly, it is submitted that the invention should not be limited by the described embodiments but rather should only be limited by the spirit and scope of the appended claims.

What is claimed is:

1. A ring generator circuitry adapted for telephone system, comprising: a circuit for switching a relay when an active AC voltage on one of the contacts of the relay is approximately zero volts, said circuit comprising:

a monitoring circuit that receives said active AC voltage and outputs a phase-shifted voltage that crosses zero volts at predetermined times before said active AC voltage traverses zero volts;

a pulse generating circuit that initiates a pulse when said phase-shifted voltage enters a predefined voltage region and terminates said pulse when said phase-shifted voltage exits said predefined voltage region; and a relay control circuit that changes state at a leading edge of said pulse following a change in an input control signal, said relay control circuit connected to a control of said relay.

2. The circuit of claim 1 wherein said predetermined times occur before a zero crossing from a negative voltage to positive voltage and before a zero crossing from a positive voltage to a negative voltage and said predetermined times are equal.

3. The circuit of claim 2 wherein a predetermined time before a zero crossing from a negative voltage to a positive voltage is greater than a predetermined time before a zero crossing from a positive voltage to a negative voltage by a width of said pulse.

4. The circuit of claim 1 wherein said the predefined voltage region has limits of 0 volts and +3 volts.

5. The circuit of claim 1 wherein a leading edge of said pulse is approximately 2.5 msec before the zero crossing of said active AC voltage.

6. A ring generator circuitry adapted for telephone system, comprising: a circuit for switching a relay when an active AC voltage on one of the contacts of the relay is approximately zero volts, said circuit comprising:

a monitoring circuit that receives said active AC voltage and outputs a phase-shifted voltage that crosses zero volts at predetermined times before said active AC voltage traverses zero volts;

a pulse generating circuit that initiates a pulse when said phase-shifted voltage enters a predefined voltage region and terminates said pulse when said phase-shifted voltage exits said predefined voltage region; and a relay control circuit that changes state at a leading edge of said pulse following a change in an input control signal, said relay control circuit connected to a control of said relay, wherein said monitoring circuit comprises:

a resistor divider formed of a first resistor and a second resistor connected in series connected between an input and ground with a capacitor across said first resistor and a diode in series with a third resistor across said second resistor; and wherein said diode conducts when the voltage at a junction of said first and second resistor is positive and said phase-shifted voltage is generated at said junction.

7. A ring generator circuitry adapted for telephone system, comprising: a circuit for providing a pulse a predetermined time before an AC input voltage traverses a zero voltage crossing, said circuit comprising:

a first resistor and a second resistor connected at first ends in series at a junction, a second end of said second resistor forming an output point and a second end of said first resistor connected to an input;

a capacitor connected in parallel across said first resistor, wherein the change in voltage across the second resistor precedes a change in voltage of said input;

a diode having an anode connected to said junction point;

a third resistor having a first end connected to a cathode of said diode and a second end connected to ground;

a first Schottky diode forward connected between said output point and a ground;

a second Schottky diode forward connected between said output point and a positive voltage;

a fourth and fifth resistor connected in series between said positive voltage and ground, in parallel with said first and second Schottky diodes, a connection between said fourth and fifth resistors providing a reference voltage;

a first and second differential amplifier configured to detect respectively when the voltage at said junction is less than said reference voltage and when the voltage at said output is greater than ground; and a diode network connecting the outputs of said differential amplifiers generating a positive pulse while said junction is between ground and said reference voltage.

* * * * *